(No Model.) 2 Sheets—Sheet 1.

J. H. ALTHANS & J. RUCKSTINAT.
DOUGH MOLDING AND DIVIDING MACHINE.

No. 527,579. Patented Oct. 16, 1894.

WITNESSES:
Henry J. Miller
Chas. H. Luther Jr.

INVENTORS:
John H. Althans and
Johannes Ruckstinat,
by Joseph A. Miller & Co.
Atty's (No Model.) 2 Sheets—Sheet 2.

J. H. ALTHANS & J. RUCKSTINAT.
DOUGH MOLDING AND DIVIDING MACHINE.

No. 527,579. Patented Oct. 16, 1894.

WITNESSES:
Henry J. Miller
Chas. H. Luther Jr.

INVENTORS:
John H. Althans
Johannes Ruckstinat,
by Joseph A. Miller & Co.
Atty's

UNITED STATES PATENT OFFICE.

JOHN H. ALTHANS AND JOHANNES RUCKSTINAT, OF PROVIDENCE, RHODE ISLAND.

DOUGH MOLDING AND DIVIDING MACHINE.

SPECIFICATION forming part of Letters Patent No. 527,579, dated October 16, 1894.

Application filed May 28, 1894. Serial No. 512,765. (No model.)

*To all whom it may concern:*

Be it known that we, JOHN H. ALTHANS and JOHANNES RUCKSTINAT, of the city of Providence, in the county of Providence and State of Rhode Island, have invented certain new and useful Improvements in Dough Molding and Dividing Machines; and we hereby declare that the following is a full, clear, and exact description of the same, reference being had to the accompanying drawings, forming part of this specification.

This invention has reference to improvements in machines for molding and dividing dough.

The object of the invention is to so construct a machine for molding and dividing bread dough that it may be more automatic in its action than those heretofore constructed.

Another object is to simplify the construction of machines of this class and to increase their utility.

The invention consists in the combination with the hopper, having a contracted molding mouth adjustable at its upper side, of the compressing rolls, one of which is adjustably mounted, together with the novel means for driving the rolls.

The invention also consists in the peculiar means for dividing the dough as it issues from the molding mouth, and the device for operating the same.

The invention also consists in such other novel features of construction and combination of parts as will hereinafter be more fully described and pointed out in the claims.

Figure 1:
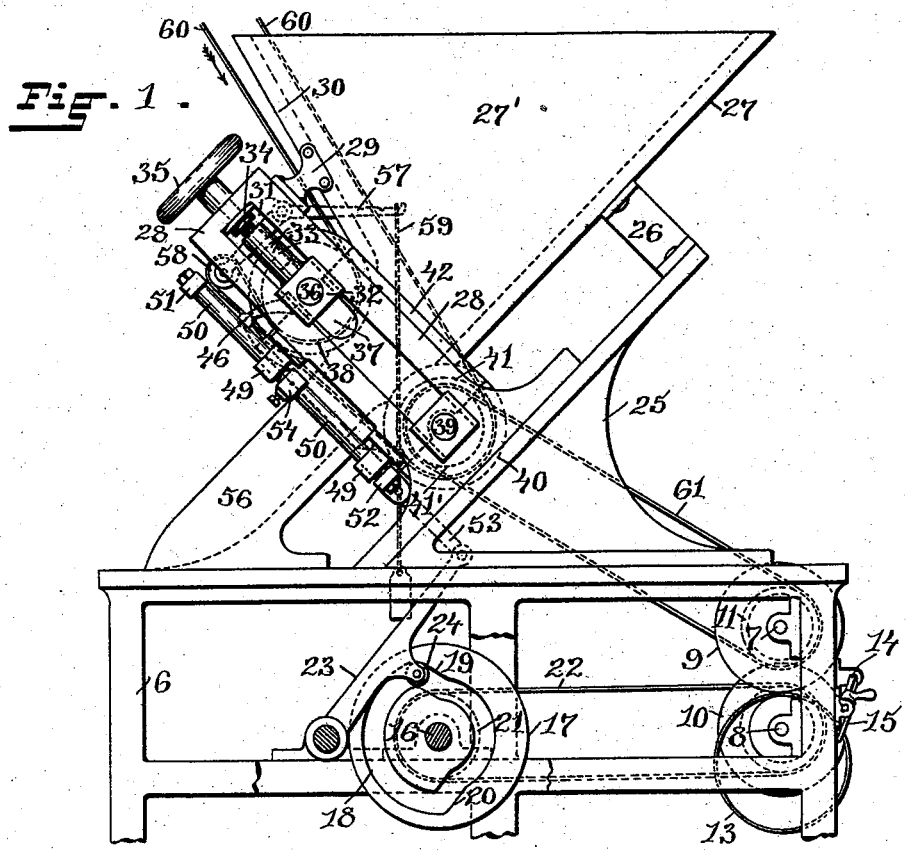
Figure 2:
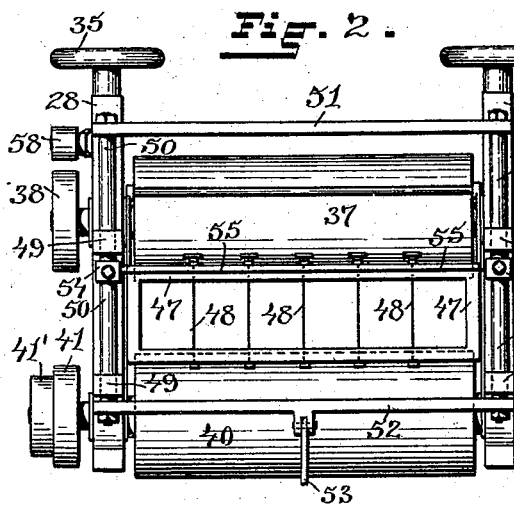
Figure 3:
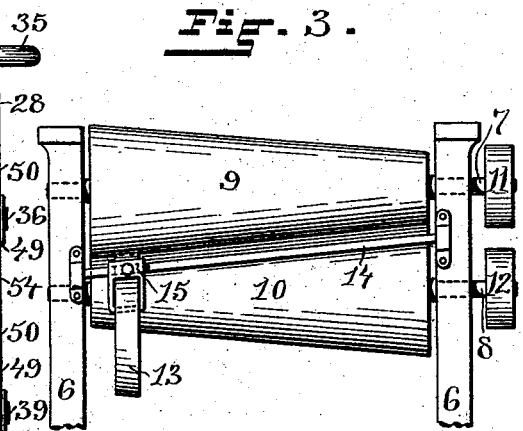
Figures 4, 5:
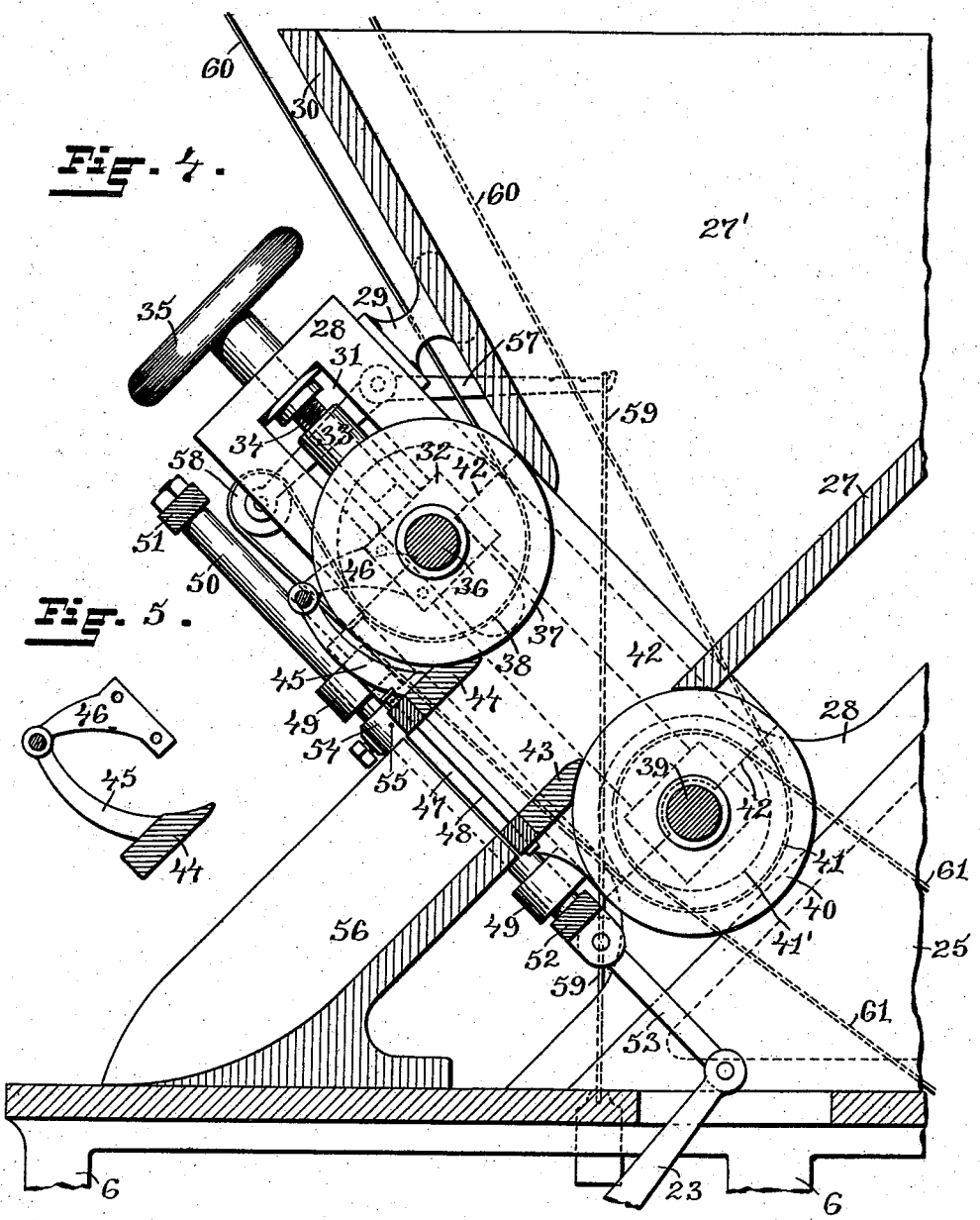

Figure 1 represents a side elevation of the improved dough molding and dividing machine. Fig. 2 represents a front view of parts of the machine. Fig. 3 represents a view of the cone-driver by means of which the speed of a portion of the divider operating mechanism is regulated. Fig. 4 represents an enlarged vertical sectional view of the molding and dividing mechanism, portions of the driving mechanism being omitted. Fig. 5 represents a detail view of the adjustable molding jaw and one of its supports, the jaw being in cross-section.

In carrying our invention into practice we construct a substantial frame-work 6 having a table top when desired. At the rear of this frame-work we provide bearings in which the shafts 7 and 8 of the oppositely-tapering cones 9 and 10 are journaled. On these shafts are secured the pulleys 11 and 12, and surrounding the cone 10 is the endless-belt 13 by the frictional contact with which motion is conveyed from the cone 9 to that marked 10. At this portion of the frame is also mounted an inclined transverse-rod 14 on which the belt-shifter 15 for shifting the belt 13 is movable.

Near the center of the frame is journaled the transverse shaft 16 on which the cam-plate 17 is mounted. This cam-plate is furnished with the cam-groove 18 having an outer and an inner dwell connected by inclined passages 19 and 20. On the shaft 16 is also a pulley 21 to which rotation is imparted by the belt 22 passing over said pulley and the pulley 12 of the cone-shaft 8. Adjacent to the cam-plate is pivotally mounted the lever 23 furnished with the roller-bearing 24 which is engaged in the cam-groove 18 and is free to follow the direction of the same.

On the table top or upper portion of the frame 6 are mounted brackets 25—25 having inclined upper surfaces. At the upper portions of these brackets are the arms 26—26 on which the inclined back 27 of the hopper 27' is supported. At the lower portions of the brackets are secured the side-frames 28—28 extending from the upper ends of which are the plates 29—29 by means of which the inclined front 30 of the hopper 27 is supported. The side-frames 28—28 have central longitudinal openings 31—31 in which the journal-blocks 32—32 are movable. These blocks are furnished with screw-threaded sockets 33—33 in which the screws 34—34 engage, the screws extending through bearings in the upper ends of the side-frames and being furnished with hand-wheels 35—35 or other means for rotating them.

In the blocks 32—32 is journaled a shaft 36 carrying a roller 37 and having a driving-pulley 38 and at the lower portions of these frames is journaled the shaft 39 carrying the roller 40 and having a step-pulley 41—41', the rollers extending for nearly the entire distance between the side-frames and being parallel to each other.

The hopper 27' extends for the entire length of the rollers 37 and 40, the back 27 being beveled on its lower edge to closely fit against the roller 40 without binding thereon, the corresponding edge of the front 30 being also cut away to allow of the adjustment of the roller 37, the rollers thus extending into the shallow passage at the lower end of the hopper and forming the upper and lower walls thereof at this point, while the ends are closed between the rollers by the side-plates 42—42 having cut-away portions through which the roller-shafts extend.

Below the rollers the passage way or chute is formed by the stationary bottom 43 and stationary sides between which the top or jaw 44 is movable. This jaw has a beveled edge fitting closely against the roller 37 and is supported by arms 45—45 which are secured to the extensions 46—46 from the bearing-blocks 32—32, so that in adjusting the roller 37 this jaw is carried with the bearing-block to correspond to the location of the roller. Before the mouth of the passage way thus formed is secured a frame 47 in which the upright wires 48—48 are secured in any well-known manner, so that they, or either of them, may be removed, as these wires determine the number of longitudinal divisions to be made in the dough as it passes from the machine.

Extending from the fronts of the side-frames 28—28 are guides 49—49 in which the side-rods 50—50 are reciprocal. These rods are connected at the upper and lower ends by the cross-bars 51—52, and to that marked 52 is pivoted the connecting-rod 53 which is pivoted at its lower end to the free end of the lever 23. Adjustably mounted, about midway on the side-rods 50—50, are clamping devices 54—54 between which the cross-wire 55 is stretched and secured, this wire being thus reciprocated directly in front of the frame 47 to divide crosswise the dough passing therethrough.

Directly before the chute and dividing mechanism is mounted the inclined receiver 56 having a bottom curving at its lower end into the plane of the table top, and sides to direct the movement of the dough, but no top, a sufficient space being left between the upper end of this receiver and the frame 47 to allow the wire 55 to move between the same.

Pivoted to one of the side-frames 28, corresponding to the ends of the shafts 36 and 39 on which the pulleys 38 and 41 are mounted, is a bent-lever 57 carrying at one end a rotatable-pulley 58, while from the other end depends a weight-carrier 59 by means of which this end of the lever is drawn downward causing the pulley end to rise and forming a take-up mechanism for the driving-belt 60 which passing downward from a pulley on the main driving-shaft, not herein shown, passes under the pulley 38, then over the pulley 58 of the belt-tightener, thence under the pulley 41 of the shaft 39 and finally back over the first driving-pulley,—the belt-tightener taking up the slack in the belt and allowing the automatic adjustment thereof when the shaft 36 with the pulley 38 and roller 37 is moved up or down.

The pulleys 41' and 11 are connected by the belt 61 by means of which motion is conveyed from the one to the other to operate the dividing mechanism.

The dough passes into the hopper after mixing, being of a consistency to retain its form for a time when molded. The belt 60 being now started, the rollers 37 and 40 are rotated in opposite directions compressing the dough between them and forcing it along between the bottom 43 of the mouth and the jaw 44. As the dough passes through the frame 47 it is divided longitudinally by the wires 48. Coincident with the starting of the belt 60 and the rotation of the rollers, motion is imparted to the belt 61 which operates the cone-drivers 9 and 10 and through them and the belt 22, causes the shaft 16 and the cam-plate 17 to rotate thus resulting in the vibration of the pivoted-lever 23, as the bearing 24 follows the course of the cam-groove 18, this lever being thrown upward and downward at each rotation of the cam-plate and causing the frame, formed of the side-bars 50—50 and the cross-bars 51 and 52, to be reciprocated to divide the dough transversely by means of the wire 55.

The longitudinal division of the dough by the wires 48 and its transverse division by the reciprocating wire 55 being sufficient to separate the same into portions suitable for the bread pans, the number of longitudinal divisions being determined by the wires 48, while the length of the pieces is regulated by the frequency with which the cross-wire 55 is reciprocated, this being governed by the shifting of the belt 13 between the cone-drivers to transfer the constant speed of the pulley 11 to the cam-plate 17 in a greater or less degree, as is well known in cone driving.

Having thus described our invention, we claim as new and desire to secure by Letters Patent—

1. In a dough molding and dividing machine, the combination with a hopper, of a bottom roll transversely journaled in fixed bearings at the lower portion of the hopper, a driving-pulley for said roll, adjustable bearings above said bottom roll, a top-roll transversely journaled in said adjustable bearings and furnished with a driving-pulley, side-plates at the ends of the rolls for closing the space between the same, extension arms secured to the adjustable bearings, arms pivoted to said extensions and depending therefrom, a transverse jaw secured to these pivoted arms and fitting against the top-roll, a belt take-up mechanism pivotally supported on the machine, and a driving-belt passing under the pulley of the top roll, over the belt take-up and under the pulley of the bottom roll, as described.

2. The combination with the frame 6, the brackets 25—25 mounted thereon, the arms 26—26 and the side-frames 28—28 secured thereto, the hopper 27' secured to the arms 26 and to the side-frames, the shaft 39 journaled in fixed bearings at the lower portions of the side-frames, the roller 40 and the pulleys 41—41' on said shaft, the bearing-blocks 32—32 movable in the side-frames and having the sockets 33, the screws 34 extending through the upper ends of the side-frames and engaged in said sockets, the shaft 39 journaled in the bearing-blocks, the pulley 38 and roller 37 mounted on said shaft, means for rotating the shafts 36 and 39 in opposite directions, and the side-plates 42—42 for closing the space between the rollers, of a chute having the rigid bottom 43, the jaw 44 adjustable in the upper portion of the chute, the arms 45—45 for supporting said jaw, the extensions 46—46, from the bearing-blocks 32, to which these arms are pivoted, and a dividing mechanism located before said chute, as described.

3. The combination with the side-frames 28, the guides 49—49 extending therefrom, the side-rods 50—50 reciprocal in the guides, the cross-bars 51 and 52 connecting the upper and lower ends of the side-rods, the connecting-rod 53 pivoted to the cross-bar 52, the clamps 54—54 adjustable on the side-rods 50, and a wire stretched between said clamps, of the pivotally-supported lever 23 pivoted to the lower end of the connecting-rod 53 and furnished with the roller-bearing 24, the shaft 16 journaled in bearings and furnished with the pulley 21, the cam-plate 17 having the cam-groove 18, consisting of an outer and an inner dwell connected by the inclined passages 19 and 20, in which the roller-bearing 24 is engaged, and means connected with the pulley 21 for regulating the speed of the same, as described.

In witness whereof we have hereunto set our hands.

JOHN H. ALTHANS.
JOHANNES RUCKSTINAT.

Witnesses:
HENRY J. MILLER,
M. F. BLIGH.